United States Patent
Rothschild

(10) Patent No.: US 7,885,951 B1
(45) Date of Patent: Feb. 8, 2011

(54) METHOD FOR EMBEDDING A MEDIA HOTSPOT WITHIN A DIGITAL MEDIA FILE

(75) Inventor: Leigh Rothschild, Sunny Isles, FL (US)

(73) Assignee: LMR Inventions, LLC, Sunny Isles Beach, FL (US)

( * ) Notice: Subject to any disclaimer, the term of this patent is extended or adjusted under 35 U.S.C. 154(b) by 379 days.

(21) Appl. No.: 12/070,370

(22) Filed: Feb. 15, 2008

(51) Int. Cl.
G06F 7/00 (2006.01)
G06F 17/30 (2006.01)

(52) U.S. Cl. .................. 707/709; 707/710; 707/712; 705/14; 705/26; 705/37; 709/227

(58) Field of Classification Search ............... 709/227; 707/712, 710, 709; 705/14, 26, 37; 345/625, 345/738
See application file for complete search history.

(56) References Cited

U.S. PATENT DOCUMENTS

| | | | | |
|---|---|---|---|---|
| 5,708,845 | A * | 1/1998 | Wistendahl et al. | 715/202 |
| 5,918,012 | A * | 6/1999 | Astiz et al. | 709/217 |
| 6,493,001 | B1 * | 12/2002 | Takagi et al. | 715/759 |
| 6,701,350 | B1 * | 3/2004 | Mitchell | 709/217 |
| 7,013,290 | B2 * | 3/2006 | Ananian | 705/27 |
| 7,162,696 | B2 * | 1/2007 | Wakefield | 715/716 |
| 7,584,118 | B1 * | 9/2009 | Bellare et al. | 705/14.69 |
| 7,685,224 | B2 * | 3/2010 | Nye | 709/201 |
| 2002/0059117 | A1 * | 5/2002 | Yoch et al. | 705/27 |
| 2002/0080165 | A1 * | 6/2002 | Wakefield | 345/738 |
| 2002/0156917 | A1 * | 10/2002 | Nye | 709/238 |
| 2003/0095681 | A1 * | 5/2003 | Burg et al. | 382/100 |
| 2004/0030741 | A1 * | 2/2004 | Wolton et al. | 709/202 |
| 2004/0127252 | A1 * | 7/2004 | Tsunomoto et al. | 709/227 |
| 2004/0199603 | A1 * | 10/2004 | Tafla et al. | 709/217 |
| 2006/0080702 | A1 * | 4/2006 | Diez et al. | 725/30 |
| 2006/0155751 | A1 * | 7/2006 | Geshwind et al. | 707/102 |
| 2006/0174209 | A1 * | 8/2006 | Barros | 715/764 |
| 2006/0268007 | A1 * | 11/2006 | Gopalakrishnan | 345/619 |
| 2007/0038514 | A1 * | 2/2007 | Patterson et al. | 705/14 |
| 2007/0038931 | A1 * | 2/2007 | Allaire et al. | 715/526 |
| 2007/0156677 | A1 * | 7/2007 | Szabo | 707/5 |
| 2007/0192352 | A1 * | 8/2007 | Levy | 707/102 |

(Continued)

OTHER PUBLICATIONS

Liu et al. "Capacity Analysis of a cellular data System with 3G/WLAN Internetworking"—vehicular Technology Conference, 2003, VTC 2003-Fall, 2003-IEEE 58th, Oct. 6-9, 2003, vol. 3 (pp. 1817-1821).*

(Continued)

Primary Examiner—Jean M Corrielus
Assistant Examiner—Anh Ly
(74) Attorney, Agent, or Firm—Scott D. Paul, Esq.; Carey Rodriguez Greenberg Paul

(57) ABSTRACT

A computer-related and/or business type method is presented for embedding one or more media hotspots within a digital media file and, in response to interaction from a separate target entity, such as via an associating request, associating one or more resultant actions with the media hotspot(s). In exchange for associating the one or more resultant actions with the media hotspot(s), an interactive media service entity being affiliated with a web site displaying the digital media file and/or a user being affiliated with the digital media file itself is compensated based upon at least one compensation plan.

16 Claims, 6 Drawing Sheets

U.S. PATENT DOCUMENTS

| | | | |
|---|---|---|---|
| 2007/0214133 A1* | 9/2007 | Liberty et al. | 707/5 |
| 2007/0255831 A1* | 11/2007 | Hayashi et al. | 709/226 |
| 2007/0265971 A1* | 11/2007 | Smalley | 705/52 |
| 2007/0271136 A1* | 11/2007 | Strauss et al. | 705/14 |
| 2008/0055275 A1* | 3/2008 | Orsley | 345/175 |
| 2008/0077483 A1* | 3/2008 | Hollo et al. | 705/14 |
| 2008/0120369 A1* | 5/2008 | Gustavsson | 709/204 |
| 2008/0154951 A1* | 6/2008 | Martinez et al. | 707/103 Y |
| 2008/0183566 A1* | 7/2008 | Montgomery | 705/14 |
| 2008/0222295 A1* | 9/2008 | Robinson et al. | 709/227 |
| 2009/0044235 A1* | 2/2009 | Davidson | 725/87 |
| 2009/0073191 A1* | 3/2009 | Smith et al. | 345/629 |
| 2009/0083225 A1* | 3/2009 | Jacobs et al. | 707/3 |
| 2009/0094039 A1* | 4/2009 | MacDonald et al. | 705/1 |

OTHER PUBLICATIONS

John Counsell—"An Evolutionary Approach to Digital Recording and Information about Heritage Sites" 2002-ACM (pp. 33-41).*
Chang et al. "On the Inter-dependency of Interactive Multimedia Protocol and Network Architecture"—1997—IEEE (pp. 284-287).*

* cited by examiner

METHOD FOR EMBEDDING A MEDIA HOTSPOT WITHIN A DIGITAL MEDIA FILE

BACKGROUND OF THE INVENTION

1. Field of the Invention

The present specification is generally directed to a computer-related method for embedding one or more media hotspots within a digital media file, and, by virtue of interaction from a separate target entity via an interactive computer network, associating the media hotspot with one or more resultant actions, such as, for example, a pop-up display, web site re-direction, macro execution, etc.

2. Description of the Related Art

As computer-related technology continues to expand and dominate various aspects of modern-day society, individual people as well as small businesses and large corporations tend to utilize computers and the World Wide Web to conduct a significant amount of day-to-day activities. In particular, not only has the World Wide Web evolved into a massive source of gathering a vast amount of information, but the World Wide Web can also be utilized as an important tool or medium for advertising and marketing. For example, one type of advertising and/or marketing campaign conducted via the World Wide Web includes the use of web banner(s) or banner ad(s) which, in general, is a an embedded advertisement disposed within one or more web pages. However, because computers and the World Wide Web have such an extravagant impact on modern-day society and today's economic market, many businesses and corporations are continuously seeking for innovative ways to increase their advertising and marketing campaigns conducted electronically such as via the World Wide Web.

In addition, the World Wide Web is also commonly utilized by individuals and businesses or other users to upload, share, distribute, and display various digital media files, such as, for example, video clips or other video content. Specifically, perhaps because many users do not have personal web space or their own web servers, video hosting/sharing services or other interactive media services, such as, for example, YOU-TUBE® (www.youtube.com) have evolved. Virtually any assortment of video content or other digital media files are typically uploaded to the interactive media services, including, but not limited to, movie clips, television clips, music videos, and amateur or personal content. Moreover, at least some of the existing video hosting/sharing services or other interactive media services track and/or display the number of requests, commonly known as "hits" or "views", for each particular video or other digital media file disposed on their web server(s). Furthermore, a user, which, as used herein is defined as an entity affiliated with the digital media file, may include for example the individual or entity who created, edited, uploaded, owns or is otherwise in control of the video content or other digital media file. Further, the user may, if desired, embed one or more media hotspots within a video or other digital media file. In particular, a media hotspot includes a demarcated area or zone disposed within peripheral confines of the digital media file typically used for hyperlinking or other Graphical User Interface (GUI) based activities, such as, pop-up displays, web page re-direction, macro execution, etc.

In general, if one or more media hotspots are desired, the user may demarcate or define at least one outer boundary of the media hotspot and embed or otherwise associate a resultant action to occur when a viewer clicks on or otherwise manipulates the media hotspot. The user may then upload or link the video or other digital media file to a web server, such as a video hosting/sharing service for others to view or access via the World Wide Web. The media hotspot, however, is typically demarcated, established, or otherwise defined by the user, such as the owner or other entity controlling the digital media file. In particular, the media hotspot may be demarcated and the corresponding resultant action may be associated therewith prior to uploading the digital media file to the World Wide Web, and/or while embedding the file into a web page, for example, by utilizing Hypertext Mark-up Language ("HTML") or other programming techniques.

Either way, it would be particularly beneficial if the computer-related method of the present specification includes permitting a separate target entity, such as, for example, an advertiser and/or marketer, to at least partially demarcate or otherwise define a media hotspot within a user's digital media file. In particular, the user's video content or other digital media file, and thus the corresponding media hotspot(s) embedded therein, may be accessible to one or more viewers via an interactive computer network, such as the World Wide Web.

Additionally, it would also be beneficial if the method of the present specification includes permitting the target entity to associate at least one resultant action with a demarcated or defined media hotspot, wherein the media hotspot is disposed within a user's video content or other digital media file. Accordingly, the target entity may create one or more media hotspots within a digital media file, such as a video clip, and associate the media hotspot(s) with a resultant action, such as a hyperlink to the target entity's web site or a web site which sells goods and/or services owned or controlled by the target entity. In particular, the target entity may strategically choose a particular video clip or other digital media file that is associated with a large number of "hits" or "views".

It would be further advantageous if the method of the present specification includes one or more compensation plans wherein the target entity compensates either the interactive media service and/or the particular user or other media file entity in exchange for associating a resultant action with one or more media hotspots embedded within the user's digital media file. The compensation plan(s) may include a one-time payment, periodic payments, pay-per-click payments, and/or any other plan to compensate the user(s) and/or interactive media service(s).

SUMMARY OF THE INVENTION

The present specification is directed to a computer-related business-type method for embedding a media hotspot within a digital media file, and, in at least one embodiment, by virtue of interaction from a separate target entity, associating at least one resultant action therewith. Moreover, in exchange for associating a resultant action with a media hotspot demarcated or otherwise embedded within the digital media file, the separate target entity compensates an interactive media service entity being affiliated with a web site displaying the digital media file to one or more viewers. In another embodiment, however, the separate target entity compensates a user who created, controls, uploaded, or is otherwise affiliated with the digital media file within which the media hotspot is embedded.

In particular, the user may upload one or more digital media files to a web site controlled or otherwise affiliated with an interactive media service entity. The user may, if desired, demarcate, define, or otherwise embed one or more media hotspots within the digital media file prior to uploading the file to the web site or its affiliated web servers. In such an embodiment, a separate target entity chooses which demarcated media hotspot(s) it desires to have its resultant action(s) associated with. As will be explained below, the resultant action(s) may include, for example, a pop-up display, web site redirection, pop-up chat box(es), macro execution, etc.

In yet another embodiment, however, the user may simply upload the digital media file to the web site or its affiliated web servers, and allow or permit the separate target entity to identify zones, areas, portions, etc. of the digital media file where it desires to have the media hotspot demarcated or otherwise embedded. In such an embodiment, the separate target entity identifies both the location of the media hotspot and the resultant action to be associated therewith.

As such, the separate target entity may compensate the interactive media service entity and/or the user in one or more of a variety manners. For example, the separate target entity may transmit a one-time payment or other compensation for the ability to associate one or more resultant actions with one or more media hotspots. In addition, however, because the number of "hits" or "views" can be easily tracked, the separate target entity may compensate the interactive media service entity and/or the user based upon the number of "hits" or "views" the digital media file enjoys, and/or the number of times the particular resultant action is executed.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
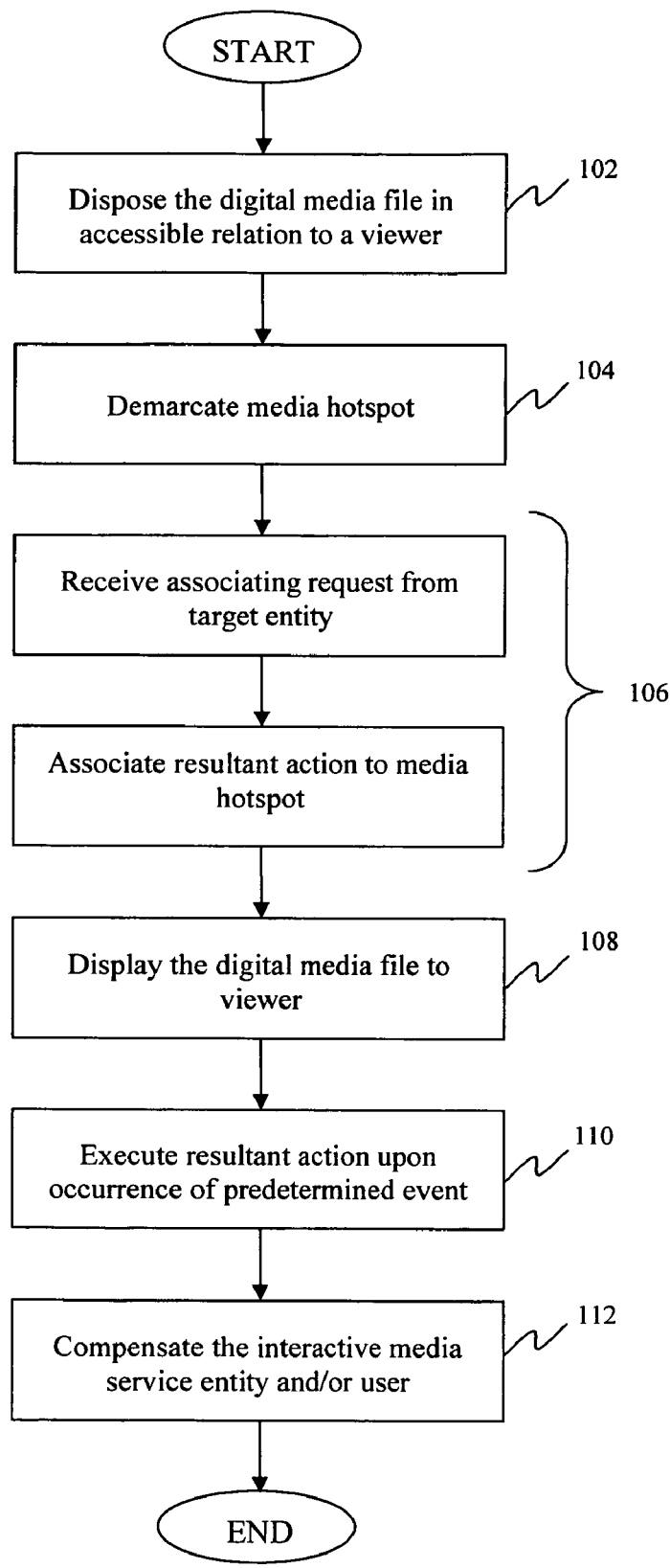
FIG. 1 is a flow chat illustrating at least one embodiment of the method disclosed in the present specification.
Figure 2:
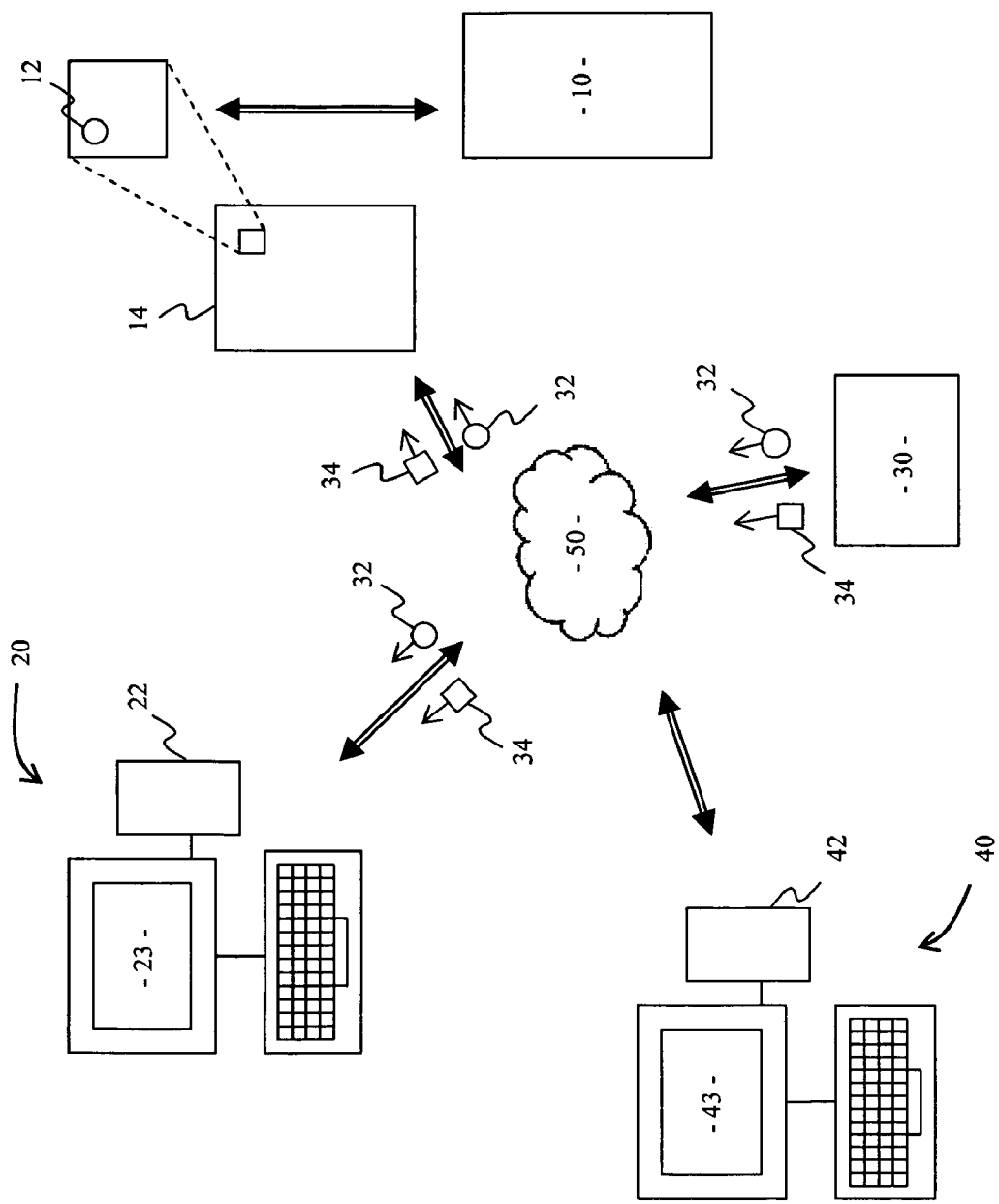
FIG. 2 is a schematic representation of at least one embodiment disclosed in the present specification.
Figure 3:
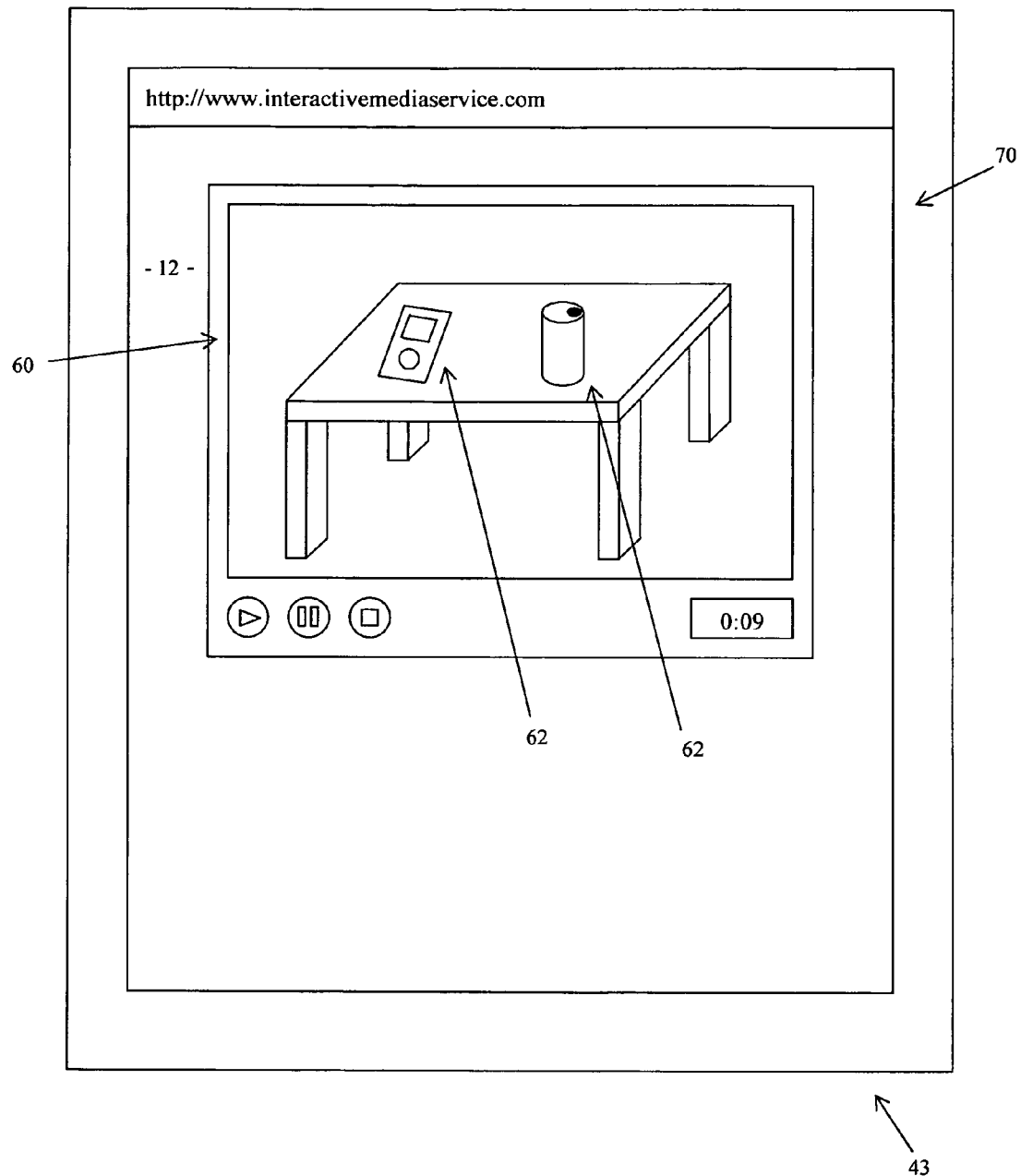
FIG. 3 is a block diagram of at least one embodiment of a digital media file as disclosed in the present specification.

As shown in the accompanying drawings, and in particular, FIG. 1, the present specification relates to a computer-related method 100 for embedding at least one media hotspot within a digital media file, and/or, in at least one embodiment, by virtue of interaction by a separate target entity via an interactive computer network, associating the at least one media hotspot with one or more resultant actions. In particular, as illustrated in FIG. 2, the present specification includes an interactive media service entity 10, a user 20, and a separate target entity 30. The interactive media service entity 10 includes, for example, any one or more individual(s), partnership(s), corporation(s), or other entity who owns, is in control of, associated with, or is otherwise affiliated with a web site 12, wherein the web site 12 is hosted by, or otherwise disposed in a communicative relation with one or more web servers 14. More in particular, the web site 12 may include one or a plurality of web pages disposed on a hard drive or other storage medium of the web server(s) 14. As will be discussed in greater detail below, the digital media file 60 of the various embodiments of the present specification is disposed in an accessible relation to one or more viewers 40 via the web site 12, by virtue of the interactive computer network 50. Moreover, the web server(s) 14 may include a computer which is structured to accept requests, such as, for example, Hypertext Transfer Protocol ("HTTP") requests, from clients and/or web browsers. Similarly, the web server(s) 14 are structured to serve responses, such as, for example, HTTP responses, via the interactive computer network 50.

Furthermore, the one or more web sites 12 of at least one embodiment of the present specification are structured and developed to facilitate one or more users 20 to upload one or more digital media files 60, for example, to the web server(s) 14. Additionally, in another embodiment, the user 10 may upload the digital media file 60 to another, non-affiliated web server, and link, embed, or otherwise display the digital media file 60 on the one or more web sites 12 of the present specification.

The user 20, as defined herein, includes any individual(s), partnership(s), corporation(s), business(es), or other entity that created, edited, owns, or is otherwise in control of or affiliated with one or more digital media files 60. Additionally, in at least one embodiment, each user 20 has an account or membership with the interactive media service entity 10 such that the user 20 may dispose the digital media files 60, such as videos, animation, photographs, digital art, etc. in a communicative relation with the web site 12 and/or web server(s) 14.

Furthermore, as will become apparent from the following discussion, the user 20, in at least one embodiment, may dispose the digital media file(s) 60 in a communicative relation with the web server(s) 14 in any one of a plurality of manners. For example, the user 20 may utilize a computer 22 connected to or otherwise disposed in a communicative relation with the interactive computer network 50 to upload the digital media file(s) 60 to the web server(s) 14. The computer 22 may include virtually any electronic device having communication functionalities, such as, for example, a laptop computer, desktop computer, personal digital assistant ("PDA"), cellular telephone, video game console, etc.

Moreover, as will also become apparent from the following discussion, the separate target entity 30, as used herein, includes any individual(s), partnership(s), corporation(s), business(es) or other entity having the desire to embed a media hotspot 62 within any one or more digital media files 60, and/or to associate a resultant action 64 with any one or more media hotspots 62 embedded within one or more digital media files 60. Specifically, for any one particular digital media file 60, the user 20 and the separate target entity 30 are separate, distinct, and preferably non-affiliated entities. Accordingly, as will be discussed below, in at least one embodiment of the present specification, the separate target entity 30 is not the entity that uploads, and/or is otherwise affiliated with or in complete control of the particular digital media file 60 within which it desires to embed a media hotspot 62 or associate a resultant action 64.

Moreover, the interactive computer network 50, as used herein, may, in at least one embodiment, generally refer to a collection of computer-related networks commonly known as the World Wide Web. Specifically, the World Wide Web represents a collection of networks cooperatively connected to each other and accessed by virtue of an Internet Protocol or other like protocols. However, it should be apparent that the interactive computer network 50 of the various embodiments of the present specification may include, for example, a Wide Area Network ("WAN"), Local Area Network ("LAN"), Intranet, peer-to-peer network, Blue Tooth network, etc.

Referring again to FIG. 1, the computer-related method 100 of at least one embodiment of the present specification includes disposing the digital media file in an accessible relation to at least one viewer via a web site, as identified at 102, wherein the web site 12 is hosted by the web server(s) 14. Particularly, as mentioned above, in at least one embodiment, the user 20 uploads the digital media file 60 to the web server(s) 14 which is structured to host the web site 12. Accordingly, the web site 12 of at least one embodiment of the present specification includes a form, option, or feature to allow a user 20 to upload one or more files, such as the digital media file(s) 60 to the one or more web servers 14.

Furthermore, the user 20 may, in yet another embodiment, upload the digital media file(s) 60 to another, non-affiliated web server, or otherwise dispose the digital media file(s) 60 in a communicative relation therewith. The user may then simply link or embed the digital media file(s) 60 within the web site 12 such that the digital media file(s) 60 is disposed in an accessible relation to one or more viewers 40 via the web site 12. Accordingly, by utilizing a computer 42 or other similar device or structure, the viewer 40 is able to access the one or more web sites 12, such as, for example, via a web browser 70, which may be displayed on a monitor 43 or other display device. Particularly, the computer 42 may include, for example, a laptop computer, desktop computer, PDA, or any other device structured to facilitate the practice of the present invention in the intended fashion.

As shown in FIG. 1, at least one embodiment of the present specification further includes demarcating the at least one media hotspot to correspond with at least a portion of the digital media file, as represented at 104. In particular, as described above, the digital media file 60 may include a video clip or other video content. For illustrative purposes only, the video clip may include a particular object, representing, for example, a soda can or portable mp3 player appearing at one or more temporal portions of the video content or other digital media file 60. In particular, the object, such as the soda can or portable mp3 player, may appear, for example, at a portion of the digital media file 60 defined between five (5) seconds and thirty (30) seconds after the beginning (i.e., at zero (0) seconds) of the video clip or other digital media file 60. As such, the at least one media hotspot 62 may be demarcated or defined as a zone or area having outer boundaries cooperatively disposed around one or more object(s) appearing in the digital media file 60, such as the soda can or portable mp3 player, which, in the particular illustrative embodiment described above, appear in the digital media file 60 between five (5) and thirty (30) seconds.

Of course, the various embodiments of the present specification are not, in any way limited to the above illustrative example, and further, the media hotspot 62 need not be associated with an object appearing within the digital media file 60. Rather, the media hotspot 62 may include, for example, the entire digital media file 60, or any one or more outer boundaries disposed within the peripheral confines of the digital media file 60 whether or not the outer boundaries correlate with, are associated with, or line up with any one or more objects, shapes, lines, etc. appearing within the digital media file 60. Moreover, the peripheral confines of the digital media file 60, as used herein, includes the outer boundary lines of digital media file 60, as it is ultimately displayed on the web site 12 to the viewer 40.

Further, the media hotspot 62 may be demarcated or otherwise embedded or defined in any one of a variety of manners. For example, in at least one embodiment of the present specification, the media hotspot 62 may be demarcated within the digital media file 60 by utilizing a computer program, including but not limited to a video-editing program, to define one or more outer boundary lines or other points which will ultimately be the media hotspot 62. In addition, the media hotspot 62, in at least one embodiment, may be demarcated at the point of embedding the digital media file 60 within the web site 12, or otherwise disposing the digital media file 60 in a communicative relation with the web server 14. For example, the media hotspot 62 may be demarcated by utilizing any one or more scripts, tags, programming languages, etc., such as, for example, Hypertext Markup Language ("HTML"), Extensible Hypertext Markup Language ("XHTML"), Hypertext Preprocessor ("PHP"), Active Server Pages ("ASP"), MACROMEDIA FLASH®, etc.

Furthermore, in at least one embodiment of the present specification, the media hotspot 62 may be demarcated on one or more digital screens which are structured to be disposed in an overlying manner relative to the digital media file 60. Accordingly, in the embodiment wherein the digital media file 60 includes a video clip or other video content, the digital screen or other like mechanism or device, which is structured to include the one or more media hotspots 62 demarcated thereon, is disposed in an overlaying manner relative to the video content and is structured to cooperatively dispose the demarcated media hotspot(s) 62 in an overlying relation to the corresponding designated zones, areas, and/or portions as the video content or other digital media file 60 runs, plays, or otherwise executes. As such, the digital screen is structured to be substantially imperceptible to the viewer 40, at least to the extent that it appears to the viewer 40 that the media hotspot 62 is embedded or demarcated within the digital media file 60 itself.

As will be explained below, the media hotspot 62 of the various embodiments of the present specification may be demarcated by the interactive media service entity 10, the user 20, the separate target entity 30, and/or any other entity which facilitates the practice of the present invention in the intended manner. Accordingly, the user 20 may, if desired, designate or identify particular objects, areas, zones, etc. within the digital media file 60 within which to use as demarcated media hotspots 60. In particular, in at least one embodiment, the user 20 demarcates the media hotspot 60 within the digital media file 60 in any one or more manners, such as, for example, by utilizing a computer program, script, programming language, and/or overlaying a screen, as described above.

Additionally, in another embodiment of the present specification, the user 20 may designate one or more objects, areas, zones, etc. and may subsequently identify them to the interactive media service entity 10. As such, the interactive media service entity 10 may provide a form or other feature or option accessible via the web site 12 wherein the user 20 may communicate the designated objects, areas, or zones to the interactive media service entity 10. The interactive media service entity 10 may then subsequently demarcate the media hotspot 60, for example, by utilizing any one or more of a plurality of manners, as identified above. In particular, the interactive media service entity 10 may embed or demarcate the media hotspot 62 directly within the digital media file 60. However, the interactive media service entity 10 may instead or additionally embed or demarcate the media hotspot 62 within a digital screen which, as described above, is disposed in an overlying relation to the digital media file 60.

Additionally, in yet another embodiment of the present specification, the separate target entity 30 may submit a demarcating request 32 to the user 20 and/or the interactive media service entity 10, for example, via the web site 12 and/or the interactive computer network 50. Specifically, the demarcating request 32 of at least one embodiment includes an identification of at least one boundary, area, zone, or object within the digital media file 60 which the separate target entity 30 desires to demarcate as a media hotspot 62. Furthermore, the demarcating request 32 of at least one embodiment of the present specification includes an identification of at least one temporal portion of the digital media file 60. In particular, in the embodiment wherein the digital media file 60 includes a video clip or other moving content, the identification of at least one temporal portion may include, for example, five (5) seconds to thirty (30 seconds of the video or other digital media file 60.

In response to the demarcating request 32 from the separate target entity 30, in at least one embodiment, the media hotspot 62 is automatically demarcated at the corresponding areas, zones, objects, etc. However, in yet another embodiment, the user 20 and/or the interactive media service entity 10 may receive the demarcating request 32 from the separate target entity 30, and if desired, may subsequently demarcate the media hotspot 62 within the corresponding digital media file 60 and/or a digital screen accordingly.

Figure 4:
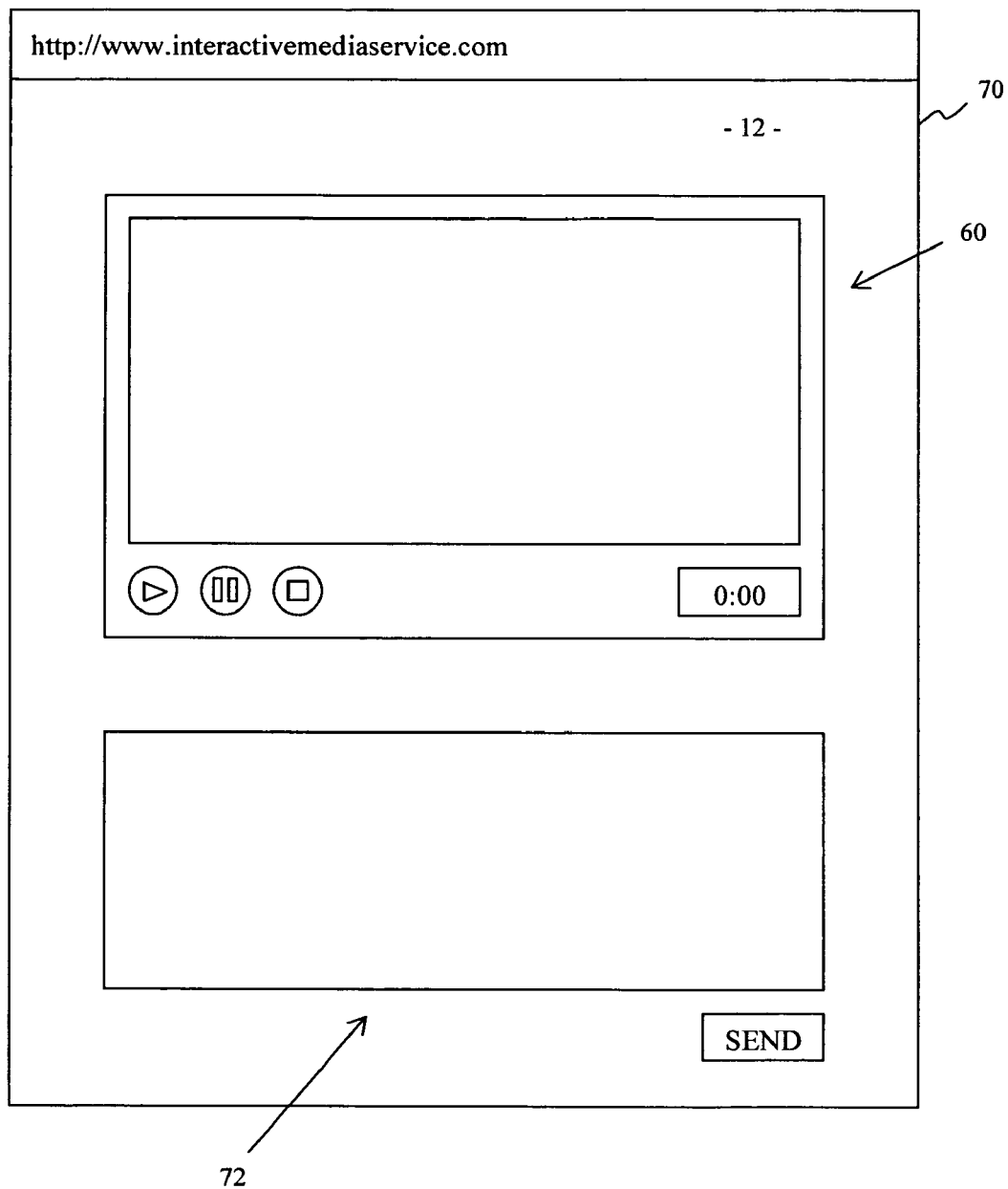
FIG. 4 is a block diagram of at least one embodiment of a web site disclosed in the present specification.

For illustrative purposes only, the separate target entity 30 may include a company or other business who sells, markets, advertises, or is otherwise affiliated with one or more products, such as, for example, portable mp3 players. The separate target entity 30, or a representative thereof, may become aware of a digital media file 60, such as a video clip, which includes, at some portion thereof, a portable mp3 player or other similar object or product. In addition, the particular digital media file 60 might be attractive to the separate target entity 30 for a variety of advertising, marketing, or other reasons. For example, the separate target entity 30 may anticipate that the particular digital media file 30 will have a significant number of "hits" or "views," or knows that the particular digital media file 60 has enjoyed a significant number of "hits" or "views" in the past. Either way, the separate target entity 30 may communicate one or more demarcating requests 32 to the interactive media service entity 10 and/or user 20 identifying the object, area, zone, etc. Accordingly, referring once again to the same illustrative embodiment described above, the demarcating request 32 may identify, for example, the portable mp3 player which appears within the video clip or other digital media file 60 between five (5) seconds and thirty (30) seconds. As illustrated in FIG. 4, the web site 12 may include a form, input box, option, or other feature 72 to allow the separate target entity 30 to communicate the demarcating request 32 to the interactive media service entity 10 or user 20. Of course, demarcating the media hotspot 62 alone will likely have little to no advantage to the separate target entity 30, however, its significance will become apparent from the following discussion.

Once the media hotspot 62 is demarcated or otherwise embedded within the digital media file 60, whether is it done via a computer program, script, overlying digital screen, etc. or by the interactive media service entity 10, the user 20, and/or the separate target entity 30, the media hotspot 62 in at least one embodiment may glow, blink, or flash to indicate to a viewer 40 its existence. In addition, the outer boundary lines or points of the media hotspot 62 may be bold, colored, or otherwise structured to separate the media hotspot 62 from other non-hotspot portions of the digital media file 60. Furthermore, when a viewer 40 rolls a mouse or other pointing device over the media hotspot 62, the pointing device may change shapes, flash, blink, etc.

In addition, at least one embodiment of the method 100 of the present invention includes, in response to an associating request 34 from the separate target entity 30, associating, in electronic digital form, a resultant action with the at least one media hotspot, as illustrated at 106 in FIG. 1. In particular, regardless of how the media hotspot 62 was demarcated or otherwise embedded within the digital media file 60, or by which entity the media hotspot 62 was demarcated, the media hotspot 62 is structured to be associated with a resultant action identified by the separate target entity 30 by virtue of the associating request 34. The resultant action may include, but is in no way limited to, a pop-up display or window, web site re-direction, macro execution, etc. Accordingly, in addition to an identification of a particular media hotspot 62, the associating request 34 may include a web site address for the pop-up display and/or web site re-direction. In addition, the associating request 34 may, in at least one embodiment, include one or more scripts, programs, etc. to run or execute upon the occurrence of a predetermined event. As such, the resultant action may also include, for example, a pop-up chat box, execution of an e-mail program, etc.

Furthermore, in at least one embodiment, the associating request 34 is communicated to the interactive media service entity 10 and/or user 20 via the interactive computer network 50. Accordingly, the web site 12 may include, for example, a text box, form, or other option or feature in which the separate target entity 30 can access so as to communicate the associating request. In at least one embodiment, the associating request 34 and the demarcating request 32, identified above, are communicated to the interactive media service entity 10 and/or the user 20 simultaneously, however, the requests 32, 34 may, in another embodiment, be communicated separately.

In addition, referring again to FIG. 1, the method 100 of the present specification further includes displaying the digital media file 60 to the at least one viewer via the interactive computer network 50, indicated at 108. As described above, the digital media file 60 is disposed in an accessible relation to the viewer 40 via the web site 12. As such, the viewer 40 may visit the web site 12 by utilizing, for example, a web browser 70, which is structured to transmit various HTTP, or other requests to the web server 14. The web server 14 then responds to the HTTP or other requests by communicating HTTP or other responses to the viewer 40. As such, the viewer 40 may view or otherwise access the digital media file 60, and thus each of the media hotspots 62 demarcated or embedded therein, and the corresponding resultant actions associated therewith.

More in particular, as illustrated in FIG. 1, the method 100 of the present specification further includes, executing the at least one resultant action upon the occurrence of a predetermined event, as shown at 110. The predetermined event may include, for example, disposing a mouse or other pointing device over the media hotspot 62 (e.g., mouseover event), clicking on the media hotspot 62 with a mouse or other pointing device, manipulating keys or buttons on a keyboard or other peripheral device, etc.

Figure 5:
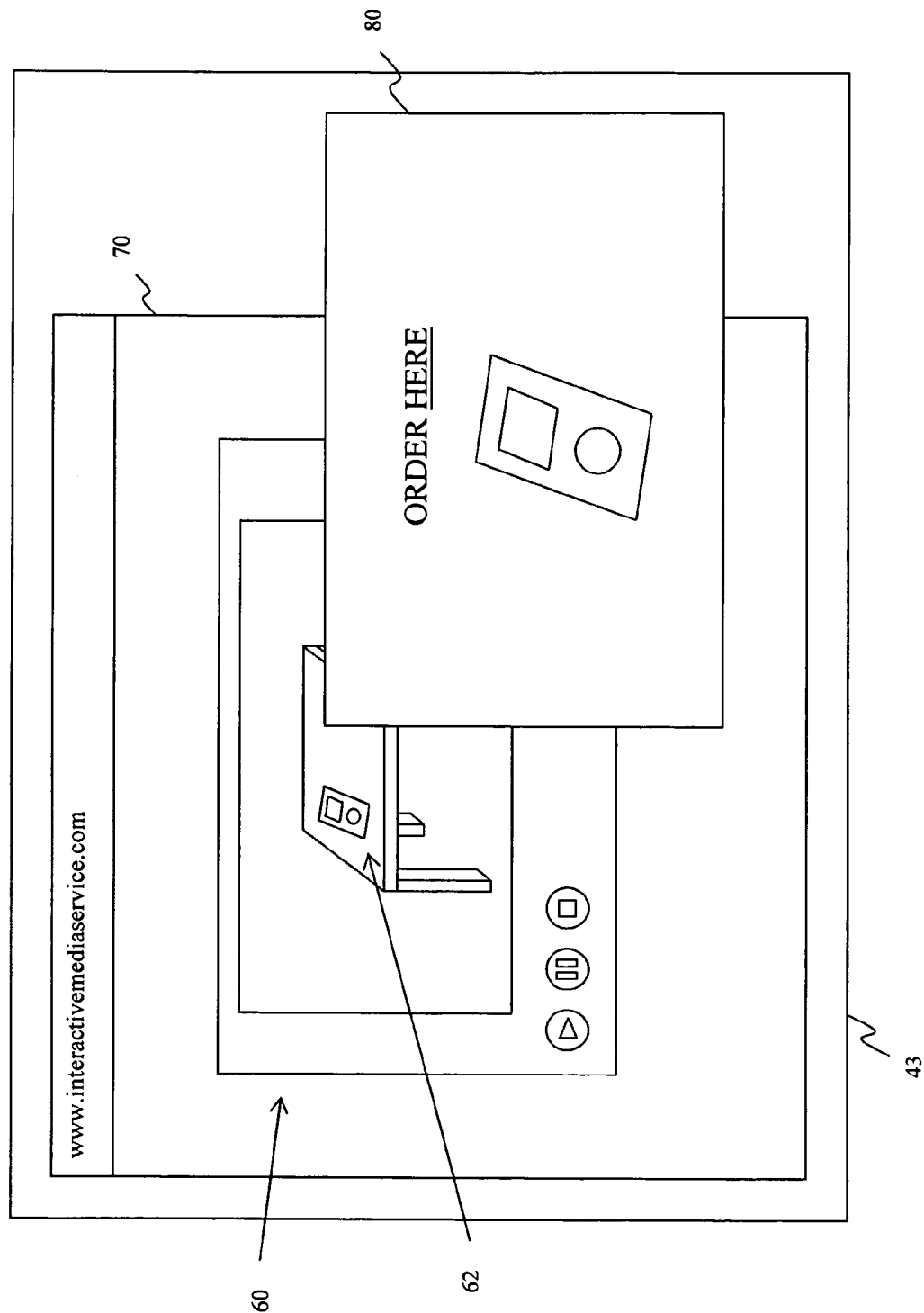
FIG. 5 is a block diagram of at least one embodiment of a resultant action disclosed in the present specification being executed.
Figure 6:
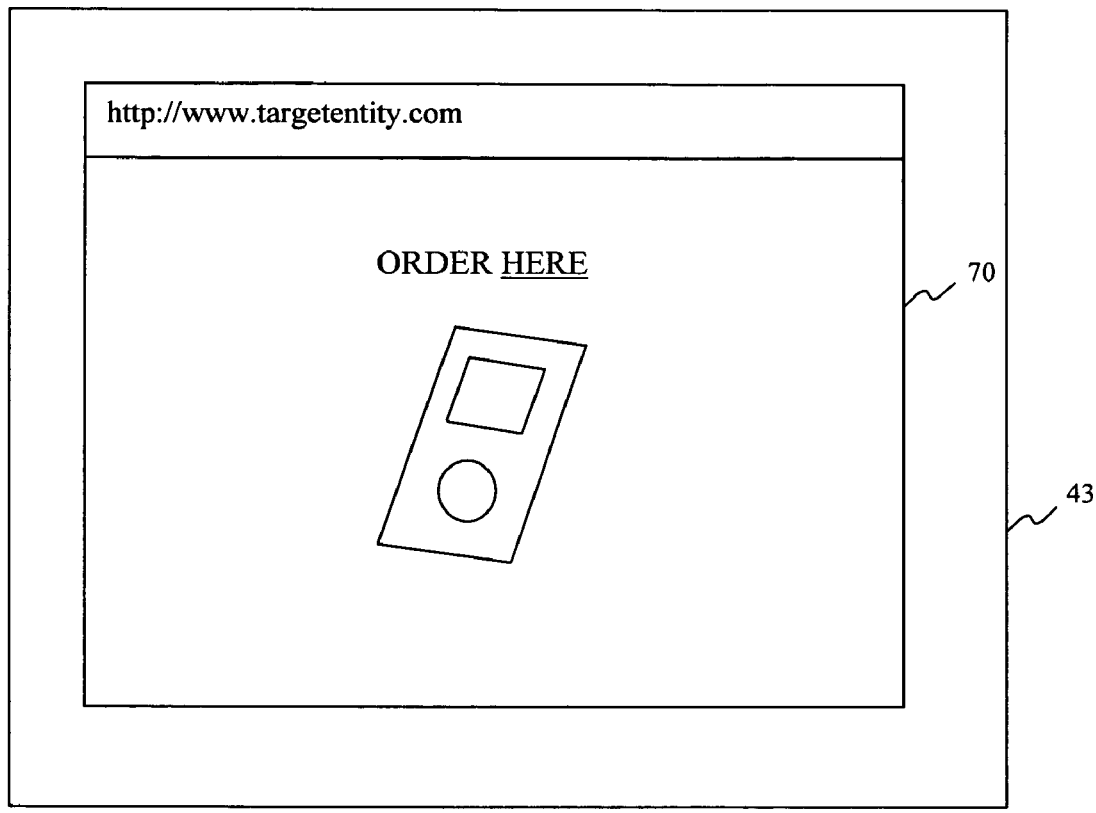
FIG. 6 is a block diagram of yet another embodiment of a resultant action disclosed in the present specification being executed.

Accordingly, as above, upon the occurrence of a predetermined event, the pop-up display, web site re-direction, macro execution, or other resultant action is structured to run or otherwise execute. Moreover, upon the occurrence of a predetermined event, in at least one embodiment, a pop-up display 80 or window may appear on the viewer's 40 computer monitor or other display device 43, as shown in FIG. 5, or web site redirection may occur, as shown in FIG. 6. As such, the separate target entity 30 may desire to associate a link or pop-up display 80 with a particular media hotspot 60, which, when executed, is structured to present a pop-up display 80 on the viewer's 40 display device 43, or direct the viewer's web browser 43 or other like device to the a particular web site, such as, for example, the separate target entity's 30 web site or a third party vendor's web site.

Thus, turning again to the same illustrative embodiment described above, a hotspot may be demarcated around the object representing the portable mp3 player, which may appear during one or more portions of the digital media file 60. Upon the occurrence of a predetermined event, such as the viewer 40 manipulating or clicking on the media hotspot 62, a pop-up display 80 may appear which, in the illustrative embodiment shown in FIG. 5, may advertise and/or sell the portable mp3 player. Again, the various embodiments of the present specification are not, in any way, limited to the illustrative embodiments descried or presented herein.

Furthermore, as illustrated in FIG. 1, the present specification further includes compensating the interactive media service entity 10 and/or the user 20, as represented at 112. Particularly, in at least one embodiment of the present specification, the separate target entity 30 compensates the interactive media service entity 30 and/or the user 20 for being able to associate one or more resultant actions, such as the pop-up display, web site redirection, macro execution, etc., with one or more media hotspots 62 embedded within a digital media file 60 displayed on the web site 12. Of course a variety of payment and/or compensation plans are contemplated. For example, the separate target entity 30, in at least one embodiment, pays a one-time fee to associate a resultant action with any one or more media hotspots 62. The payment may be directly to the interactive media service entity 10, and/or the user 20.

Moreover, in yet another embodiment, the separate target entity 30 pays or otherwise compensates the interactive media service entity 10 and/or the user 20 based upon the number of "views" or "hits" the digital media file 60 enjoys and/or based upon the number of times the corresponding resultant action gets executed or otherwise displayed to the viewer 40. Of course the compensation plans are not, in any way limited to the above described illustrative examples.

In yet another embodiment of the present specification, the user 20 demarcates the media hotspot 62 and associates at least one resultant action therewith prior to uploading the digital media file 60 to the web server 14 and/or otherwise disposing the digital media file 60 in communicative relation therewith. In particular, the resultant action may include a pop-up display, web site re-direction, etc. which may be associated with or otherwise related to the user 20. Accordingly, the user 20 may compensate the interactive media service 10 based upon at least one compensation plan associated with the digital media file 60 and/or the media hotspot(s) 62. For example, the user 20 may compensate the interactive media service 10 based upon the number or volume of media hotspots 62 embedded within the digital media file 60. The compensation may be a flat fee or based upon a periodic payment, such as monthly or yearly. In addition, the user 20 may compensate the interactive media service 10 based upon the "views", "hits" or other traffic that accesses or views the digital media file 60. Furthermore, in at least one embodiment, the user 20 may compensate the interactive media service 10 based upon the number of "clicks" on the one or more media hotspots 62, and/or based upon a percentage of money the user 20 collects for transactions related to or otherwise affiliated with the digital media file 60 and/or media hotspot(s) 62.

For exemplary purposes only, the user 20 may upload or otherwise dispose a digital media file 60 in communicative relation with the web server 14, wherein the digital media file 60 includes a video related to a charity. The user 20 may demarcate or embed one or more media hotspots 62 within the video wherein the resultant action(s) associated therewith include additional information and/or one or more ways to facilitate a viewer to donate to the charity, for example. Accordingly, the user 20 may compensate the interactive media service 10 based on any one or more compensation plans, which may include, for example, a monthly, yearly, or other periodic payment based upon the number of media hotspots 62 embedded within the digital media file 60, and/or a percentage of money collected as donations to the charity.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A computer-implemented method for embedding at least one media hotspot within a digital media file, comprising:
   disposing the digital media file in an accessible relation to at least one viewer via a web site, wherein the web site is hosted by at least one web server, the web server being disposed in a communicative relation with an interactive computer network,
   demarcating the at least one media hotspot to correspond with at least a portion of the digital media file,
   in response to an associating request received from a separate target entity, associating, in electronic digital form, a resultant action with the at least one media hotspot, the associating request being communicated via the interactive computer network,
   compensating an interactive media service entity in exchange for associating the at least one resultant action with the at least one media hotspot, the interactive media service entity being affiliated with the at least one web site,
   compensating a user in exchange for associating the at least one resultant action with the at least one media hotspot, wherein the user is affiliated with the digital media file,
   defining the demarcating request as identifying an area disposed within the digital media file,
   identifying at least one temporal portion of the digital media file,
   defining the associating request as at least identifying the at least one media hotspot, and
   communicating an identification of the at least one resultant action to the interactive media service entity via the interactive computer network, wherein
   the user is different than the interactive media service entity.

2. The computer-implemented method recited in claim 1 further comprising demarcating the at least one media hotspot at least partially within the digital media file.

3. The computer-implemented method recited in claim 1 further comprising demarcating the at least one media hotspot within a digital screen, wherein the digital screen is disposed in an overlying relation to the digital media file.

4. The computer-implemented method recited in claim 1 further comprising displaying the digital media file to the at least one viewer via the interactive computer network.

5. The computer-implemented method recited in claim 1 further comprising defining disposing the digital media file in an accessible relation to the at least one viewer as including uploading the digital media file to the at least one web server via the interactive computer network.

6. The computer-implemented method recited in claim 1 further comprising, in response to a demarcating request received from the separate target entity, demarcating the at least one media hotspot to correspond with at least a portion of the digital media file.

7. The computer-implemented method recited in claim 6, further comprising
defining the demarcating request as at least identifying an area disposed within the digital media file.

8. A computer-implemented method for embedding at least one media hotspot associated within a digital media file, comprising:
disposing the digital media file in an accessible relation to at least one viewer via a web site, wherein the web site is hosted by at least one web server, the web server being disposed in a communicative relation with an interactive computer network,
in response to a demarcating request received from a separate target entity, demarcating the at least one media hotspot to correspond with at least a portion of the digital media file,
in response to an associating request received from the separate target entity, associating, in electronic digital form, at least one resultant action with the at least one media hotspot,
compensating an interactive media service entity in exchange for associating the at least one resultant action with the at least one media hotspot, the interactive media service entity being affiliated with the at least one web site,
compensating a user in exchange for associating the at least one resultant action with the at least one media hotspot, wherein the user is affiliated with the digital media file,
defining the demarcating request as identifying an area disposed within peripheral confines of the digital media file,
identifying at least one temporal portion of the digital media file,
defining the associating request as at least identifying the at least one media hotspot, and
communicating an identification of the at least one resultant action to the interactive media service entity via the interactive computer network, wherein
the user is different than the interactive media service entity.

9. The computer-implemented method recited in claim 8 further comprising
displaying the digital media file to the at least one viewer via the interactive computer network.

10. The computer-implemented method recited in claim 9 further comprising
executing the at least one resultant action upon the occurrence of at least one predetermined event.

11. The computer-implemented method recited in claim 8, further comprising
defining the demarcating request as at least identifying an area disposed within the digital media file.

12. A computer-implemented method for embedding at least one media hotspot associated within a digital media file, comprising:
demarcating the at least one media hotspot within a portion of the digital media file,
associating, in electronic digital form, at least one resultant action with the at least one media hotspot,
disposing the digital media file in an accessible relation to at least one viewer via a web site, wherein the web site is hosted by at least one web server, the at least one web server being disposed in a communicative relation with an interactive computer network,
displaying the digital media file to the at least one viewer via the interactive computer network,
executing the at least one resultant action upon the occurrence of at least one predetermined event,
compensating an interactive media service entity based upon at least one compensation plan, wherein the interactive media service entity is affiliated with the at least one web site, and
compensating a user in exchange for associating the at least one resultant action with the at least one media hotspot, wherein the user is affiliated with the digital media file,
defining the demarcating request as identifying a zone disposed within the digital media file,
identifying at least one temporal portion of the digital media file,
defining the associating request as at least identifying the at least one media hotspot, and
communicating an identification of the at least one resultant action to the interactive media service entity via the interactive computer network, wherein
the user is different than the interactive media service entity.

13. The computer-implemented method recited in claim 12 further comprising
in response to at least one demarcating request received from a separate target entity, demarcating the at least one media hotspot within the portion of the digital media file.

14. The computer-implemented method recited in claim 13 further comprising
in response to an associating request received from the separate target entity, associating, in electronic digital form, the at least one resultant action with the at least one media hotspot.

15. The computer-implemented method recited in claim 14, further comprising
defining the demarcating request as at least identifying a zone disposed within the digital media file.

16. The computer-implemented method recited in claim 14, further comprising
defining the associating request as at least identifying the at least one media hotspot, and
communicating the identification of the at least one resultant action to the user.

* * * * *